United States Patent
Athreya et al.

(10) Patent No.: US 12,189,986 B2
(45) Date of Patent: Jan. 7, 2025

(54) METHODS AND SYSTEMS FOR SOFTWARE BASED PREFETCHING FOR LOW BUFFER DEPTH SEQUENTIAL READ TRAFFIC

(71) Applicant: SK Hynix NAND Product Solutions Corp., Rancho Cordova, CA (US)

(72) Inventors: Arun Athreya, Folsom, CA (US); Mariusz Dolny, Gdańsk (PL); Bartosz Kot, Gdańsk (PL); Michał Mamczyński, Gdynia (PL); Shivashekar Muralishankar, Folsom, CA (US); Shankar Natarajan, Folsom, CA (US); Yihua Zhang, Folsom, CA (US)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 0 days.

(21) Appl. No.: 18/438,886

(22) Filed: Feb. 12, 2024

(65) Prior Publication Data

US 2024/0220157 A1 Jul. 4, 2024

Related U.S. Application Data

(63) Continuation of application No. 18/091,061, filed on Dec. 29, 2022, now Pat. No. 12,067,284.

(51) Int. Cl.
*G06F 3/06* (2006.01)

(52) U.S. Cl.
CPC .......... *G06F 3/0656* (2013.01); *G06F 3/0611* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 6,981,127 B1 | 12/2005 | Singh et al. | |
| 8,732,406 B1 | 5/2014 | Pase et al. | |
| 9,229,854 B1 * | 1/2016 | Kuzmin | G06F 3/0679 |
| 9,792,995 B1 * | 10/2017 | Shah | G11C 7/1039 |
| 10,445,229 B1 * | 10/2019 | Kuzmin | G06F 12/10 |
| 2013/0179632 A1 | 7/2013 | Ben-Shemesh et al. | |
| 2022/0317917 A1 | 10/2022 | Li | |
| 2024/0086107 A1 * | 3/2024 | Nayak | G06F 3/0679 |

* cited by examiner

*Primary Examiner* — Charles Rones
*Assistant Examiner* — Ralph A Verderamo, III
(74) *Attorney, Agent, or Firm* — HALEY GUILIANO LLP

(57) ABSTRACT

A system and related method, including storage circuitry and a control circuitry, which while executing a storage device driver, is to receive at least one instruction of a stream of instructions for the storage device. The control circuitry determines that a hardware buffer of the storage device is storing less than two instructions. In response to the determination that the hardware buffer of the storage device is storing less than two instructions, the control circuitry accesses data associated with an address of the memory of the storage device, wherein the address is predicted based on analysis of the stream of instructions and causes to be stored the data in a buffer of a plurality of buffers. The control circuitry executes an instruction of the stream of instructions using at least the data stored in the buffer.

28 Claims, 10 Drawing Sheets

Incoming
Instructions 404

⋮

Read at Address 1036
Read at Address 1037
Read at Address 1038
Read at Address 1039
Read at Address 1040

⋮

Time t₁

400

Storage Device Driver
204

| Prefetched Data at Address 1006 406 | Prefetched Data at Address 1007 408 | Prefetched Data at Address 1008 410 | Prefetched Data at Address 1009 412 | Prefetched Data at Address 1010 414 | ••• | Prefetched Data at Address 1036 416 | Prefetched Data at Address 1037 418 |

Last Buffer Entry 420

401

Time t₂

Storage Device Driver
204

| Prefetched Data at Address 1006 406 * | Prefetched Data at Address 1007 408 * | Prefetched Data at Address 1008 410 * | Prefetched Data at Address 1009 412 * | Prefetched Data at Address 1010 414 * | ••• | Prefetched Data at Address 1036 416 * | Prefetched Data at Address 1037 418 * |

* Reusable Buffer Entry

402

Time t₃

Storage Device Driver
204

| Prefetched Data at Address 1038 420 | Prefetched Data at Address 1039 422 | Prefetched Data at Address 1040 424 | Prefetched Data at Address 1041 426 | Prefetched Data at Address 1042 428 | ••• | Prefetched Data at Address 1068 430 | Prefetched Data at Address 1069 432 |

FIG. 4

METHODS AND SYSTEMS FOR SOFTWARE BASED PREFETCHING FOR LOW BUFFER DEPTH SEQUENTIAL READ TRAFFIC

CROSS-REFERENCE TO RELATED APPLICATION

This application is a continuation of U.S. patent application Ser. No. 18/091,061, filed Dec. 29, 2022, the disclosure of which is incorporated by reference in its entirety.

TECHNICAL FIELD

The present disclosure is related to host device systems and related methods for software-based prefetching for low hardware buffer depths in a storage device, wherein the host device is executing a storage device driver. More particularly, this present disclosure is related to analyzing, by host software, received read instructions in order to predict a stream of instructions and prefetch data from memory based on the prediction in order to improve latency of streams of spatially sequential read instructions.

SUMMARY

In accordance with the present disclosure, systems and methods are provided for software-based prefetching that operates on a host device. More particularly, a host device that is communicatively coupled to a storage circuitry, such as on a solid-state drive (SSD) with a low instruction hardware buffer depth, while the host device is executing a storage device driver. In some embodiments, the storage circuitry (e.g., SSD device) may be located within the host device or be connected to a host via a suitable cable. For example, a storage host device may include storage circuitry (e.g., SSD device), control circuitry, and additional memory (e.g., RAM that is faster than SSD memory). In some embodiments, the storage circuitry may be an SSD or other suitable storage non-volatile memory drive, which contains a hardware buffer.

In one approach, the current technique is performed when the hardware buffer comprises less than two outstanding hardware instructions (e.g., exactly one hardware instruction). The software-based prefetching may be implemented at least in part on the control circuitry using software, hardware, or a combination thereof. In some embodiments, when the hardware buffer of the storage circuitry has a low buffer depth (e.g., one outstanding hardware instruction stored in hardware buffer), without software-based prefetching, the control circuitry must access data for incoming hardware instructions directly from the storage device without benefit of pipelining or pre-fetching, which may cause larger latencies. To solve this problem, prefetching may be initiated by software at the host-level (e.g., by the storage device driver) when the number of outstanding hardware instructions in the hardware buffer is low. This approach reduces latency of accessing memory by the storage device driver storing data in a buffer provisioned on a memory device that has shorter access times (e.g., RAM memory), reducing the overall latency of storage access.

In some embodiments, the software-based (e.g., driver based) prefetching can be used to improve instruction processing efficiency at low hardware buffer depth of any suitable host device having control circuitry executing a device driver, coupled to a hardware buffer. In some embodiments, the device may, for example, be any suitable host device that is executing a memory device driver.

In some embodiments, the host device is provided having a control circuitry and storage circuitry that is communicatively coupled to each other. In some embodiments, the control circuitry includes a processor, a software instruction buffer, and a storage device driver with a plurality of buffers. In some embodiments, the control circuitry (e.g., while executing the storage device driver) is configured to incrementally receive a stream of read instructions to be executed by the control circuitry. The control circuitry further determines, while executing a storage device driver, that the hardware buffer of the storage circuitry currently stores less than two hardware instructions (i.e., or exactly one hardware instruction). In some embodiments, when the control circuitry determines that the hardware buffer currently stores less than two hardware instructions (i.e., or exactly one hardware instruction), the control circuitry predicts addresses of future read instructions based on the received read instructions of the stream of instruction. The control circuitry then accesses data associated with a predicted address of the memory of the storage circuitry and stores that data in the software buffer. In some embodiments, when the control circuitry later receives the predicted software read instruction, the control circuitry fulfills by prefetching at least the data stored in the software buffer. In some embodiments, the received stream of instructions may be received from the operating system of a host, from another application executing on the host, or from a device other than the host device.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, and/or characteristic included in at least one implementation. Thus, phrases such as "in one embodiment" or "in an alternate embodiment" appearing herein describe various embodiments and implementations, and do not necessarily all refer to the same embodiment. However, they are also not necessarily mutually exclusive.

FIG. 4 shows illustrative diagrams of a storage device driver at two different times (time $t_1$ and time $t_2$), in accordance with some embodiments of the present disclosure;

DETAILED DESCRIPTION

Figure 1:
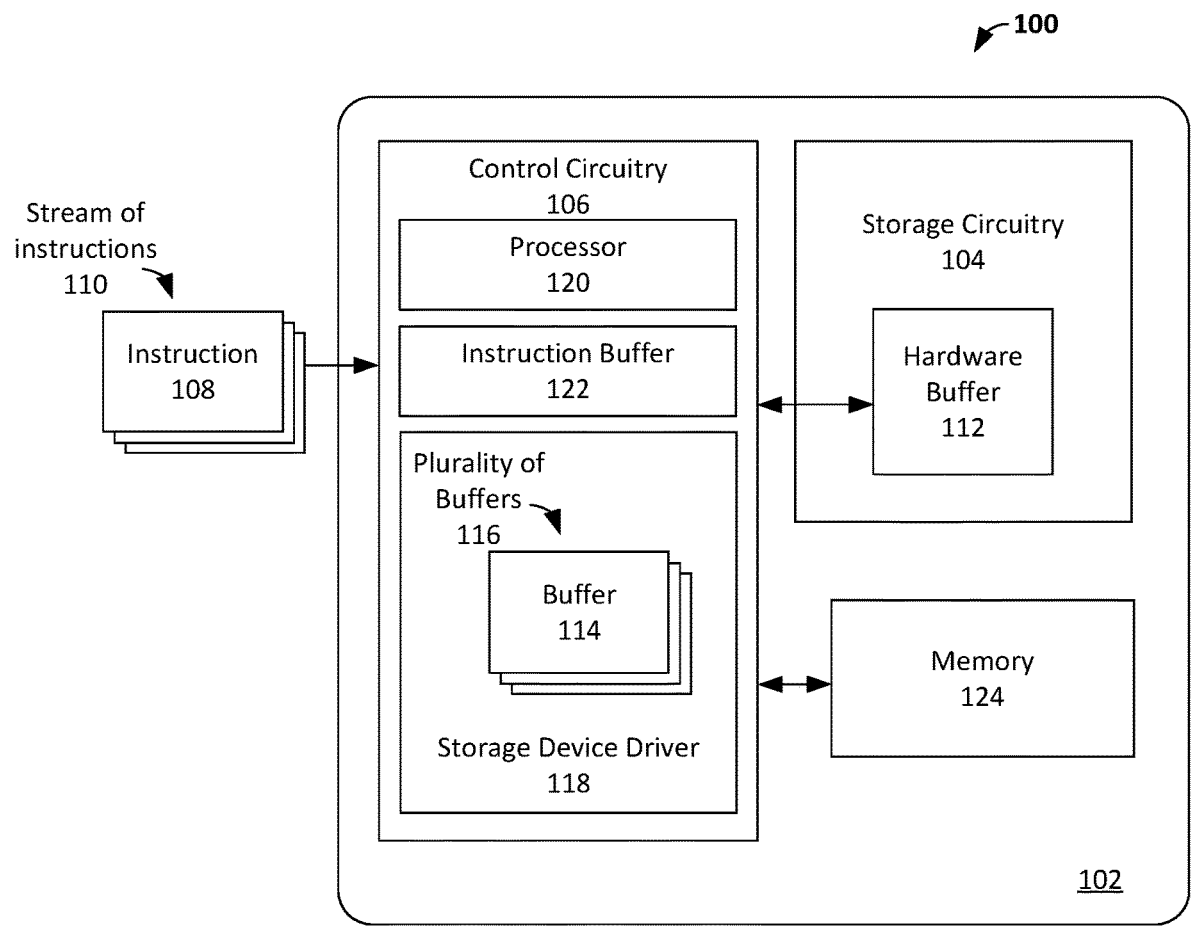
FIG. 1 shows an illustrative diagram of a system of a host device system with storage circuitry, control circuitry, and a storage device driver, in accordance with some embodiments of the present disclosure.

In accordance with the present disclosure, host device systems and methods are provided for software-based (e.g., storage device driver-based) prefetching for low hardware buffer depths in storage circuitry to improve the operational quality of the host system (e.g., improve latency when a hardware buffer has a low number of outstanding hardware instructions). In some embodiments, the hardware buffer (e.g., of the storage circuitry) may be an instruction stack or an instruction queue for the storage circuitry. In some embodiments, the hardware buffer and storage circuitry may be located outside of the host device (e.g., connected via a suitable cable). A host device may have a control circuitry that executes a storage device driver for controlling the storage device. The storage device driver may provide a plurality of buffers (e.g., using RAM of the host device). In some embodiments, control circuitry of the host device may include a processing unit (e.g., a processor), which may operate on an instruction of a stream of instructions (e.g., a sequential stream of instructions), wherein the control circuitry (e.g., when executing the storage device driver) receives the stream of instructions. In some embodiments, a spatially sequential stream of read instructions includes instructions stored at sequential memory addresses. In some embodiments, executing an instruction may be split up into stages of four timing categories, including: software sending/completing the instruction, hardware processing the instruction, software idling time while hardware processes the instruction, and software copying a prefetched buffer.

In some embodiments, for each instruction of a stream of instructions, the operations run sequentially with regard to clock cycles. In a single processor example, the hardware processing of a second instruction cannot necessarily start before the hardware processing of a first instruction is complete. By analyzing a particular number of instructions of the stream of instructions and predicting which prefetched data to access based on the identified stream of instructions, the latency of accessing data by the host device is improved upon. In some embodiments, the storage control circuitry, while executing the storage device driver, analyzes a portion or a particular number of incoming instructions in order to predict a stream of instructions associated which prefetched data stored in the plurality of buffers. A software-based prefetching for the host device driver may enable an improved latency of the host device when driving instructions or requests.

In one approach, when the hardware buffer has a low number of hardware instructions (e.g., less than two or only one hardware instruction), the instruction may be driven and there may be additional latency between each instruction request that the control circuitry receives due to inability to fully exploit pipeline of the storage device.

To solve this problem, the operation of the host device may have the software (e.g., storage device driver) predict and prefetch data associated with at least one instruction such that the storage device driver does not have to idle between the receipts of each instruction. Therefore, the storage device driver predicts a stream of instructions and prefetches data associated with the predicted stream of instructions before any additional requests are received. In this way, the latency of the host device is lowered in the situation when the number of instructions in the hardware buffer is below two hardware instructions (i.e., or exactly one instruction).

In some embodiments, a processor of the control circuitry may be a highly parallelized processor capable of handling high bandwidths of instructions quickly (e.g., by starting simultaneous processing of new instructions before completion of previous instructions).

In some embodiments the system and methods of the present disclosure may refer to a host device communicatively coupled to an SSD storage system, wherein the host device is executing a storage device driver with a plurality of buffers for a network protocol interface, such as non-volatile memory express (NVMe) buffers.

An SSD is a data storage device that uses integrated circuit assemblies as memory to store data persistently. SSDs have no moving mechanical components, and this feature distinguishes SSDs from traditional electromechanical magnetic disks, such as, hard disk drives (HDDs) or floppy disks, which contain spinning disks and movable read/write heads. Compared to electromechanical disks, SSDs are typically more resistant to physical shock, run silently, have lower access time, and less latency.

Many types of SSDs use NAND-based flash memory which retains data without power and include a type of non-volatile storage technology. Quality of Service (QOS) of an SSD may be related to the predictability of low latency and consistency of high input/output operations per second (IOPS) while servicing read/write input/output (I/O) workloads. This means that the latency or the I/O command completion time needs to be within a specified range without having unexpected outliers. Throughput or I/O rate may also need to be tightly regulated without causing sudden drops in performance level.

The subject matter of this disclosure may be better understood by reference to FIGS. 1-9.

FIG. 1 shows an illustrative diagram of a host device system 100 with storage circuitry 104, control circuitry 106, and a storage device driver 118, in accordance with some embodiments of the present disclosure. In some embodiments, host device system 100 may include a host device 102, which includes control circuitry 106 and storage circuitry 104. In some embodiments, control circuitry 106 may include a processor 120, a software instruction buffer (e.g., reserved in memory 124), and a storage device driver 118 with a plurality of buffers 116 (e.g., reserved in memory 124). In some embodiments, the plurality of buffers 116 and the software instruction buffer may use memory 124 other than storage circuitry 104 (e.g., memory 124 may be RAM memory with lower access latency than storage circuitry 104).

In some embodiments, each buffer 114 is configured to store data associated with an instruction of a determined stream of instructions (e.g., prefetched data from a predicted address of a stream of instructions in storage circuitry 104) in order to manage instruction stream detection for software-based prefetching. In some embodiments, the software instruction buffer 122 is used as a temporary software buffer to store received software instructions when the control circuitry 106, while executing the storage device driver 118, is analyzing and predicting a stream of instructions. In some embodiments, the storage circuitry 104 includes a hardware buffer 112, which is configured to store hardware instructions. The host device 102 may also include memory 124, such as volatile memory, such as RAM memory (e.g., dynamic random access memory (DRAM)), which has faster access times compared to access times of storage circuitry 104 (e.g., SSD). It will be understood that the embodiments of the present disclosure are not limited to SSDs. For example, in some embodiments, the host device system 100 may include a hard disk drive (HDD) device in addition to or in place of the storage circuitry 104.

In some embodiments, the host device system 100 may receive a stream of instructions 110 from a source, wherein the source is externally located from the host device 102 or located within the host device 102 (e.g., from an application). In some embodiments, control circuitry 106 may identify a stream of instructions 110 when it receives read requests for several (e.g., five or ten or any other suitable number) sequential addresses in storage circuitry 104.

In some embodiments, memory 124 includes any one or more of a non-volatile memory, such as Phase Change Memory (PCM), a PCM and switch (PCMS), a Ferroelectric Random Access Memory (FeRAM), or a Ferroelectric Transistor Random Access Memory (FeTRAM), and a Magnetoresistive Random Access Memory (MRAM), any other suitable memory, or any combination thereof. In some embodiments, memory 124 includes any one of a non-volatile memory, volatile memory, or any combination thereof. In some embodiments, control circuitry 106 is communicatively coupled to the hardware buffer 112 of the storage circuitry 104, in order to receive information of outstanding hardware instructions stored in the hardware buffer 112. In addition, the control circuitry 106 is communicatively coupled to the memory 124. In some embodiments, a data bus interface is used to transport instructions (e.g., instruction 108) or an address or data associated with the instruction. The data bus between the memory 124 and control circuitry 106 provides a network bus for the reading or writing of data through memory 124. Processor 120 of control circuitry 106 may include a hardware processor, a software processor (e.g., a processor emulated using a virtual machine), or any combination thereof. Processor 120 may include any suitable software, hardware, or both for controlling the storage device driver 118, instruction stream prediction, and the prefetching of data associated with the predicted instruction stream. Memory 124 may include hardware elements for non-transitory storage of commands or instructions.

In some embodiments, memory 124 is a multi-plane or three-dimensional (3D) memory array. In some embodiments, memory 124 includes floating-gate NAND gates. The control circuitry 106 may receive a sequential read command which causes a read operation. The read operation may be a snap read operation, which is used to access a 4K, 8K, or 16K of data from memory 124. In some embodiments, a snap read operation is used to access any other suitable size of data from memory 124. In some embodiments, the sequential read command may cause a read that accesses multiple planes of memory 124. The control circuitry 106 may cause a multi-plane read by using an independent multi-plane read operation (IMPRO), which accesses portions of at least two different planes of the memory 124. To improve the efficiency of IMPRO, the control circuitry 106 may be configured to perform IMPRO using the snap reads. This allows the control circuitry 106 to perform multi-plane snap reads to access at least two planes of the memory 124.

The control circuitry 106, while executing the storage device driver 118, is configured to receive an instruction 108 of the stream of instructions 110 and determine how many outstanding hardware instructions are stored within the hardware buffer 112. When the control circuitry 106, while executing the storage device driver 118, determines that there is a low hardware buffer 112 depth (e.g., a hardware buffer depth of exactly one hardware instruction), the control circuitry 106 may prefetch data associated with an address of the memory 124 where the address is predicted based on the stream of read instructions 110. In some embodiments, control circuitry 106, while executing the storage device driver 118, stores the prefetched data for the stream of instructions 110 in a buffer 114 of the plurality of buffers 116. When the control circuitry 106 receives instruction 108 as part of the stream of instructions 110, if that instruction matches data that was prefetched based on a prediction, the instruction 108 is fulfilled by storage device driver 118 directly from buffer 114 without a need to further access storage circuitry 104.

Storage circuitry 104 (for example, SSD devices) may include one or more packages of non-volatile memory dies, where each die includes storage cells. In some embodiments, the storage cells are organized into pages, and pages are organized into blocks. Each storage cell can store one or more bits of information.

It will be understood that, while host device system 100 depicts an embodiment in which a host device 102, while executing a storage device driver 118, is configured to have software-based prefetching capabilities in accordance with the present disclosure, any other suitable device can have software-based prefetching in a similar manner.

For purposes of clarity and brevity, and not by way of limitation, the present disclosure is provided in the context of software-based prefetching for low hardware buffer depth that provides the features and functionalities disclosed herein. The software-based prefetching can be configured by any suitable software, hardware, or both for implementing such features and functionalities. Software-based prefetching can be at least partially implemented in, for example, host device system 100 (e.g., as part of host device 102, or any other suitable device on which efficiency may improve at low hardware buffer depth), while executing storage device driver 118. For example, for a host device 102 communicatively coupled to a solid-state storage device (i.e., storage circuitry 104), software-based prefetching can be implemented in control circuitry 106, while executing storage device driver 118. In some embodiments, software-based prefetching can be at least partially implemented as part of an operating system for a host device system in which the storage device driver 118 is integrated.

Figure 2:
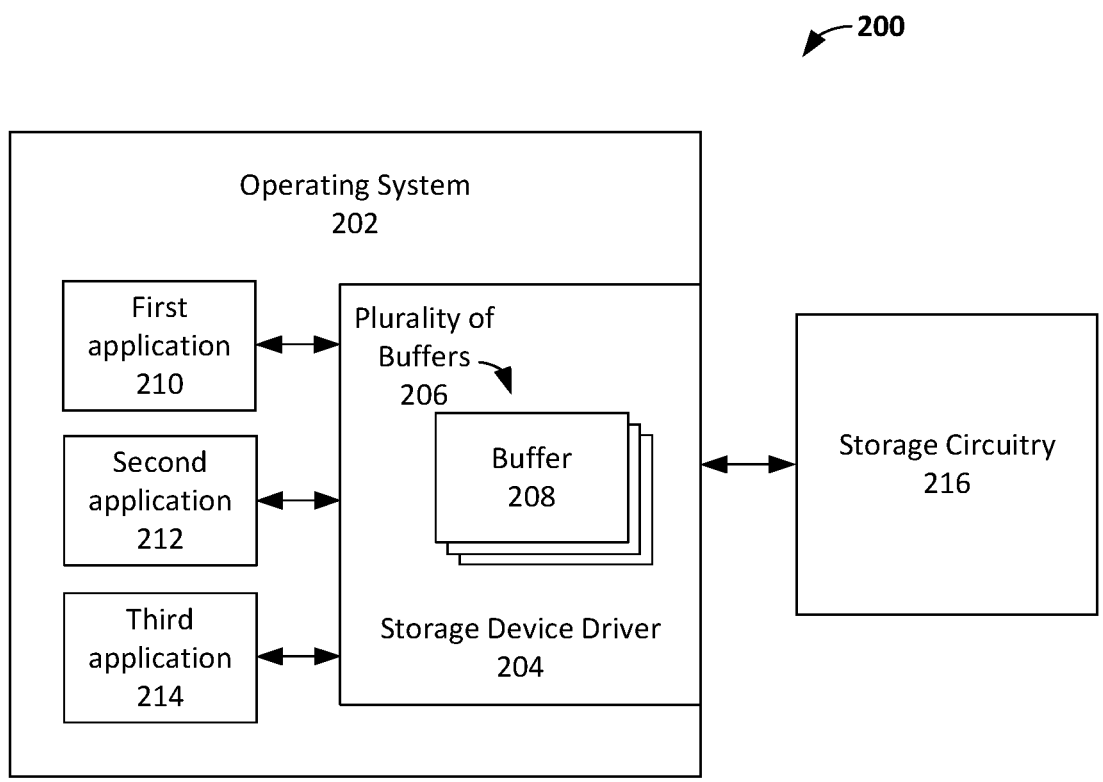
FIG. 2 shows an illustrative diagram of an operating system handling multiple applications, while executing a storage device driver, in accordance with some embodiments of the present disclosure.

FIG. 2 shows an illustrative diagram of an operating system 202 handling multiple applications (e.g., first application 210, second application 212, and third application 214), while executing a storage device driver 204, in accordance with some embodiments of the present disclosure. While three applications (210, 212, and 214) are shown in FIG. 2, any suitable number of applications can be included in some embodiments. In some embodiments, the operating system 202 is loaded on the control circuitry 106 of host device 102 (as seen in FIG. 1). In some embodiments, the storage device driver 204 includes a plurality of buffers 206, wherein each buffer 208 is configured to store a data associated with a determined stream of instructions for software-based prefetching. In some embodiments, each buffer 208 may store prefetched data for streams from applications 210-214 in memory that is faster than storage circuitry 216 (e.g., in memory 124 of FIG. 1). In some embodiments, the storage device driver 204, the plurality of buffers 206, buffer 208, and storage circuitry 216 correspond to the storage device driver 118, plurality of buffers 116, buffer 114, and storage circuitry 104 in FIG. 1, respectively. The storage device driver 204 may be commutatively coupled to storage circuitry 216.

In some embodiments, the storage device driver 204 receives streams of instructions from multiple applications, such as a first stream of read instructions from the first application 210, a second stream of read instructions from the second application 212, and a third stream of read instructions from the third application 214. The storage device driver 204 may also receive streams of instructions 110 from the operating system 202 or from outside of the operating system 202, which is shown in system 100 in FIG. 1. In some embodiments, the storage device driver 204 may receive more than three different streams of read instructions from more than three applications.

In some embodiments, each buffer 208 of the plurality of buffers 206 may store data associated with a stream of instructions that was prefetched from storage circuitry 216. In some embodiments, the control circuitry 106, while executing the storage device driver 204, may keep track of whether a buffer 208 that is storing data associated with a partial stream of instructions or data associated with a complete stream of instructions is storing valid data by configuring a valid bit bitmap. In some embodiments, each buffer 208 of the plurality of buffers 206 may correspond to a bit of the bitmap wherein the bit map contains a flag bit for each buffer 208 of the plurality of buffers 206. The valid bit may be useful for when determining which buffer 208 to clear or overwrite when each buffer 208 of the plurality of buffers 206 is storing data associated with a partial stream of instructions or data associated with a complete stream of instructions.

Figure 3:
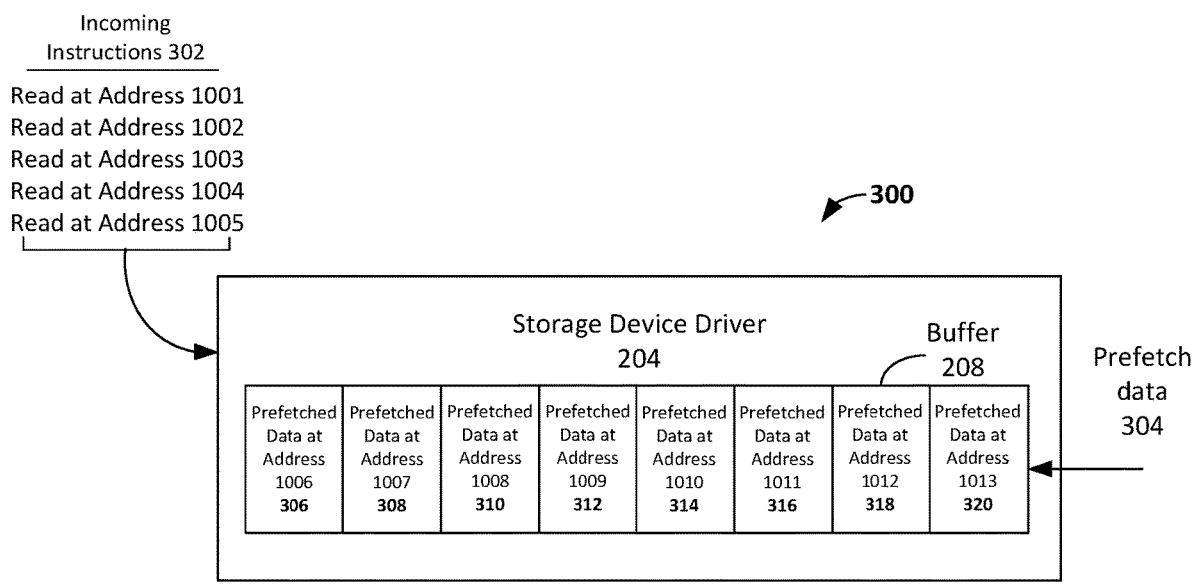
FIG. 3 shows a diagram of a buffer of the storage device driver, in which a stream of instructions is detected, in order to prefetch data of a predicted stream of instructions when the hardware buffer has a low number of hardware instructions, in accordance with some embodiments of the present disclosure.

FIG. 3 shows a diagram of a buffer 208 of the storage device driver 204, in which a stream of instructions 302 is detected, in order to prefetch data of a predicted addresses of the stream of instructions (e.g., 306, 308, 310, 312, 314, 316, 318, 320) when the hardware buffer has a low number of hardware instructions, in accordance with some embodiments of the present disclosure. In some embodiments, the storage device driver 204 and buffer 208 correspond to the storage device driver 118 and buffer 114 in FIG. 1, respectively.

The storage device driver 204 contains a buffer 208 which stores data associated with a stream of instructions (e.g., 306, 308, 310, 312, 314, 316, 318, and 320). As shown, the control circuitry 106 incrementally receives the incoming instructions 302 (e.g., read instruction at address 1001, read instruction at address 1002, read instruction at address 1003, read instruction at address 1004, and read instruction at address 1005). In some embodiments, the control circuitry 106, while executing the storage device driver 204, analyzes a particular number of incoming instructions 302 to predict a stream of instructions. In some embodiments of the present disclosure, the number of incoming instructions and number of buffers are not limited to the number of incoming instructions 302 and number of buffers 208 shown in FIG. 3, respectively. For example, the control circuitry 106, while executing the storage device driver 204, predicts a stream of instructions because a particular number of requests (e.g., five or ten) to read data from five addresses (e.g., addresses 1001-1005) were received by the storage device driver 204. In some embodiments, the control circuitry 106, while executing the storage device driver 204, prefetches the data associated with the predicted addresses of stream of instructions. The control circuitry 106, while executing the storage device driver 204, does not prefetch any data until the stream of spatially sequential read instructions (e.g., addresses 1001-1005) is detected. For example, the control circuitry 106 may predict the addresses of the stream of instructions after sequentially receiving read instruction at address 1001 through read instruction at address 1005 (thus control circuitry 106 may predict that the stream will in the future have read request for addresses following address 100, i.e. addresses 1006, 1007, 108 . . . etc.). Therefore, the control circuitry 106, while executing the storage device driver 204, prefetches the data 304 associated with the future instructions of the predicted addresses of stream of instructions (e.g., 308, 310, 312, 314, 316, 318, and 320). As shown, prefetched data from predicted addresses 1006-1013 is stored in buffer 208 before the stream of instruction 302 requests data from the predicted addresses. By using software-based prefetching, the data associated with the predicted addresses of the stream of instructions are more easily accessible with smaller access latencies while stored in buffer 208 than if stored in host memory 124.

FIG. 4 shows illustrative diagrams 400, 401, and 402 of a storage device driver 204 at three different times (time $t_1$, time $t_2$, and time $t_3$), in accordance with some embodiments of the present disclosure. For example, the buffer at time $t_1$ may be the same as buffer 208 in FIG. 3. As shown at time $t_1$, the buffer stores prefetched data from spatially sequential addresses 1006-1037 (e.g., 406, 408, 410, 412, 414, 416, and 418). In one example, when prefetched data from address 1037 was stored into the last entry in the buffer 418, the buffer had no more space to store prefetched, and prefetching may have been temporarily paused or continue prefetching data into another available buffer. In the shown example, the prediction was correct and the stream of sequential read instructions 404 began to request data from addresses 1006 to address 1037. Because that data was prefetched, storage device driver 204 may have served that data from the buffer. When the data from address 1037 was requested, the control circuitry, while executing the storage device driver 204, provides the stored prefetched data from buffer entry 418, and determines that the last prefetched data in the buffer was already requested by the stream of sequential read instructions 404. Therefore, the buffer may be reused for further prefetching of data at the predicted sequential addresses of the stream of read instructions 404 (e.g., for read instruction at address 1038, read instruction at address 1039, read instruction at address 1040, etc.). In some embodiments of the present disclosure, the number of incoming instructions is not limited to the number of incoming instructions of the stream of sequential read instructions 404 shown in FIG. 4.

At time $t_2$, the control circuitry marks the buffer entries as stale and available for reuse. Therefore, the buffer entries of the buffer are available for storing data associated with a newly identified stream of instructions or continuing to prefetch a currently identified stream of sequential read instructions. At time $t_3$, the control circuitry, while executing the storage device driver resumes prefetching predicted instructions for the stream of sequential read instructions 404 (e.g., by prefetching data from addresses 1038-1069 into the previously stale buffer). In some embodiments, the buffer entries (e.g., 420, 422, 424, 426, 428, 430, and 432) are no longer marked as stale, by setting the corresponding valid bits of the valid bit map to indicate valid data. In another example, the buffer can be used for a newly predicted stream of instructions. For example, if another stream of instructions requested reads from addresses 2500-2505, the buffer may prefetch data from address 2506 to 2537 for quicker data access when processing the instructions.

In some embodiments, the valid bit bitmap which indicates whether each buffer of the plurality of buffers may be either a valid buffer or a stale buffer. At time $t_2$, the "*" symbols within the buffer entries of buffer 204 denote a corresponding valid bit for buffer 208 in the bitmap for the plurality of buffers. These valid bits may be useful for when determining which buffer memory to clear or overwrite when each buffer of the plurality of buffers is storing data associated with a partial stream of instructions or data associated with a complete stream of instructions. Therefore, at time $t_2$, buffer 208 is marked as a stale buffer and is available to control circuitry to be reused for storing data associated with a newly identified stream of instructions.

Figure 5:
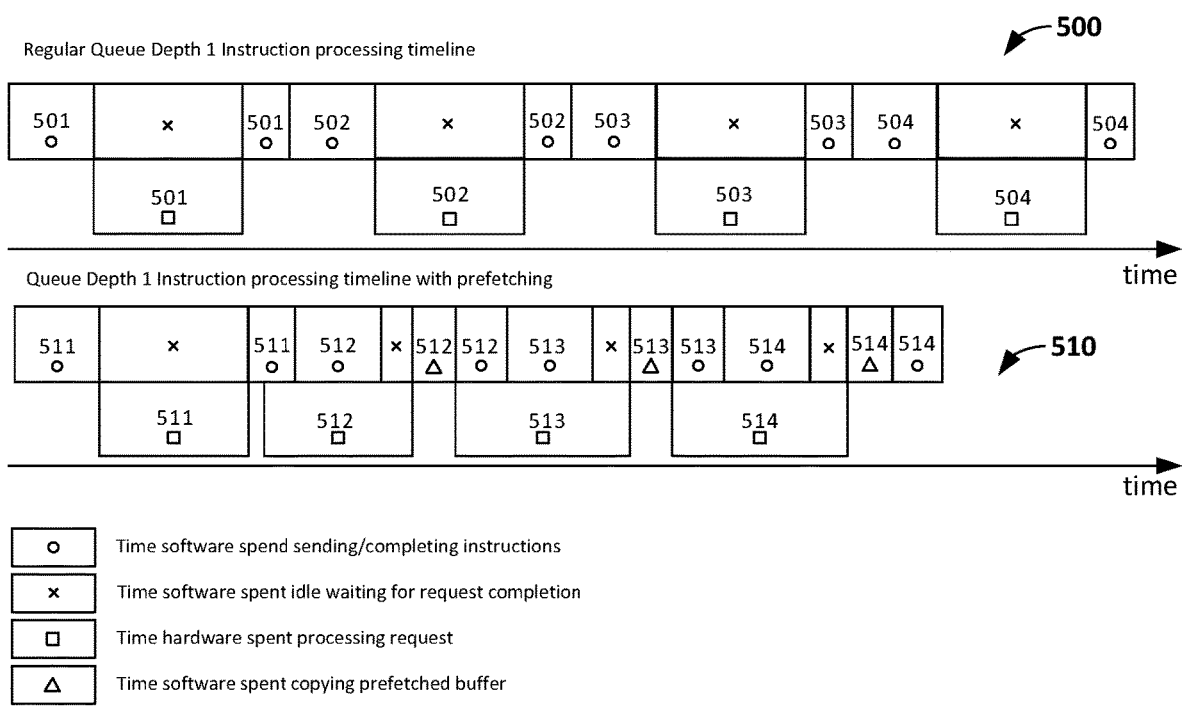
FIG. 5 shows an illustrative diagram of two timelines of executing instructions with prefetching disabled and prefetching enabled, in accordance with some embodiments of the present disclosure.

FIG. 5 shows an illustrative diagram of two timelines of executing instructions (e.g., 501, 502, 503, 504, 511, 512, 513, and 514) with prefetching disabled 500 and prefetching enabled 510, in accordance with some embodiments of the present disclosure. To show a comparison between the two timelines 500 and 510, there are four instructions shown in each timeline, wherein each instruction is a sequential read instruction. In addition, each timeline has an instruction which corresponds to the opposite timeline. For example, instruction 501 is assumed to be the exact same instruction as instruction 511, just in different implementation for instruction processing.

In some embodiments, executing an instruction may be split up into stages of four timing categories, including: software sending/completing the instruction, hardware processing the instruction, software idling time while hardware processing the instruction, and software copying a prefetched buffer. However, in general, for each instruction of a stream of instructions, the operations must run sequentially with regard to clock cycles. In a single processor example, the hardware processing of a second instruction 502 cannot necessarily start before the hardware processing of a first instruction 501 is complete.

In some embodiments of the present disclosure, the timeline without prefetching 500, indicates a cyclic pattern of instruction processing, with a consistent idle time of the software of the storage device waiting for the instruction processing in hardware to be complete. However, once a stream of instructions is predicted by the control circuitry, while executing a storage device driver (as seen in the prefetching timeline), the control circuitry is able to prefetch data associated with the predicted stream of instructions for the second instruction 512 before the second instruction is received and sent to be processed. As expected, the latency of each first instruction 501 and 511 of the two timelines have the same latency. The latency of subsequent instructions is reduced because the latency associated with accessing a buffer of the plurality of buffers is much smaller than accessing the host memory (e.g., RAM memory). By prefetching the data at the predicted sequential addresses into a buffer, the control circuitry can access the data quickly as the data is requested. Although the latency of subsequent instructions (e.g., 512, 513, and 514) for the prefetching timeline 510 is reduced, the latency of the first instruction remains the same as the control circuitry has not yet prefetched any data for the first instruction 511 and is to use the first instruction 511 to determine a predicted stream of instructions.

Figure 6:
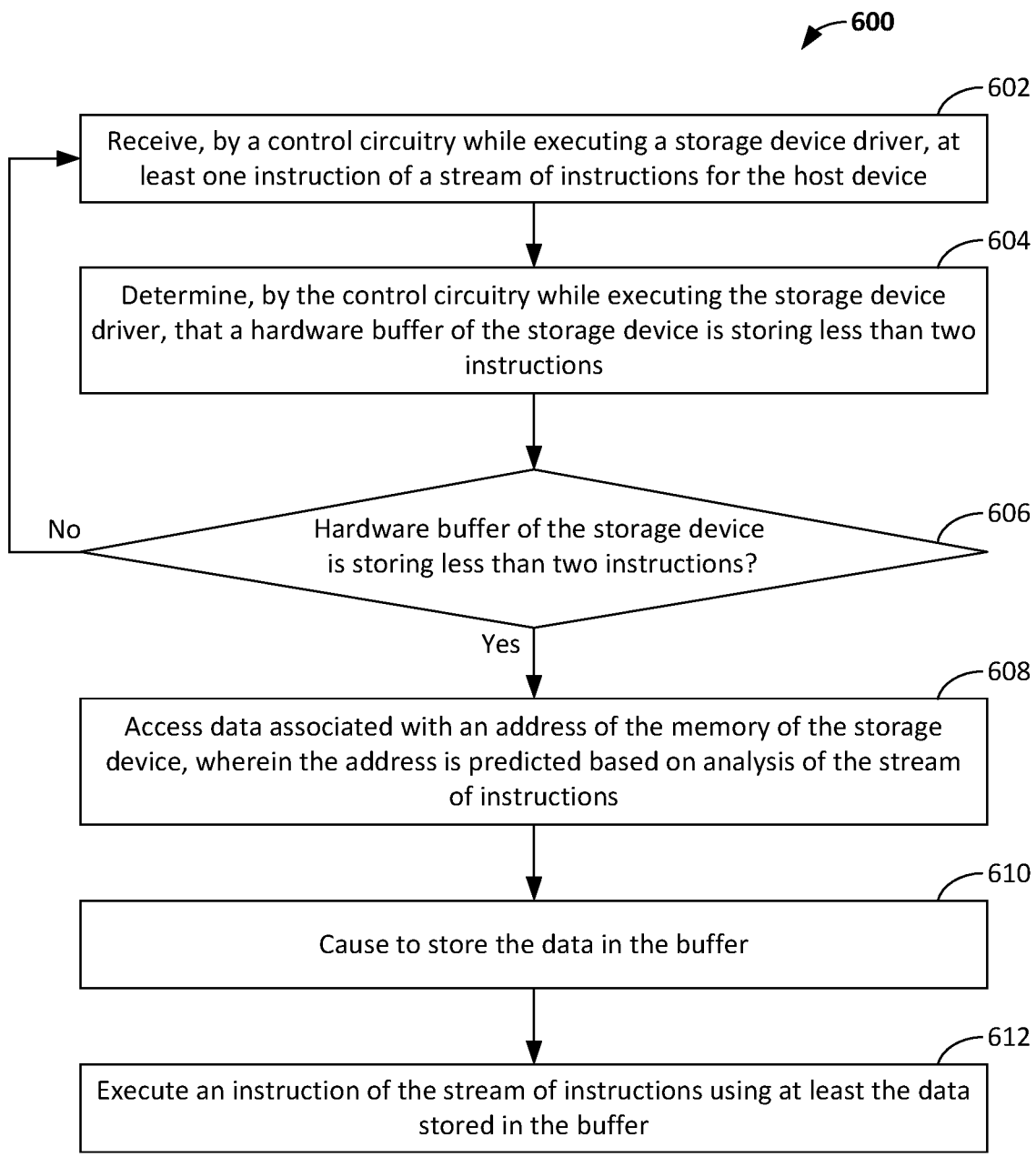
FIG. 6 shows a flowchart illustrating a process for accessing data associated with an address of a memory of a host device and executing an instruction of the stream of instructions using at least the prefetched data stored in a buffer, in accordance with some embodiments of the present disclosure.

FIG. 6 shows a flowchart illustrating a process 600 for accessing data associated with an address of a memory of a storage device and executing an instruction of the stream of the stream of instructions using at least the data stored in a buffer, in accordance with some embodiments of the present disclosure. In some embodiments, the referenced control circuitry, storage device driver, instruction of a stream of instructions, storage device, hardware buffer, memory, and buffer may be implemented as control circuitry 106, storage device driver 118, instruction 108 of a stream of instructions 110, storage device 102, hardware buffer 112, memory 124, and buffer 114, respectively. In some embodiments, the process 600 can be modified by, for example, having steps rearranged, changed, added, and/or removed.

At step 602, the control circuitry, while executing a storage device driver, receives at least one instruction of a stream of instructions for the storage device. In some embodiments of the present disclosure, the stream of instructions may be of an external source, outside of the storage device. In some embodiments, the stream of instructions may be of an internal source within the operating system (e.g., operating system 202), such as an application with a number of outgoing instructions to be executed. In some embodiments, the control circuitry, while executing the storage device driver, is capable of receiving multiple streams of instructions from sources that are located within or outside of the storage device. In some embodiments, the streams of instructions are sequential streams of instructions, wherein at least one instruction is a sequential read instruction. After the receipt of a stream of instructions the control circuitry, while executing the storage device driver, then determines that the hardware buffer of the storage circuitry (e.g., storage circuitry 104) stores less than two outstanding hardware instructions, at step 604.

At step 604, the control circuitry, while executing the storage device driver, determines whether the hardware buffer of the storage device is currently storing less than two instructions. In some examples, when there is a low depth (e.g., exactly one hardware instruction is stored in the hardware buffer) of outstanding hardware instructions in the hardware buffer, the amount of time to access data associated with the outstanding instructions that is stored in a buffer of the plurality of buffers may be less than the latency of receiving a subsequent instruction of a stream of instructions. In an example without prefetching, the storage device driver and control circuitry have large latencies for accessing data associated with the outstanding instruction from memory. In some embodiments, this increase in latency is detrimental to the efficiency of the processing capabilities of the host device.

At step 606, the control circuitry, while executing the storage device driver, determines a next step for the process 600 based on whether the hardware buffer is currently storing less than two hardware instructions at 604. If the hardware buffer is storing two or more hardware instructions, the control circuitry will, while executing the storage device driver, continue to receive streams of instructions while executing the outstanding hardware instructions in the hardware buffer without any instruction stream prediction or software-based prefetching, at 602. In some embodiments, if the hardware buffer is currently storing only one hardware instruction or is not currently holding any instructions, the control circuitry will, while executing the storage device driver, perform stream prediction by accessing data associated with an address of the memory of the storage device, at 608.

At step 608, the control circuitry, while executing the storage device driver, accesses data associated with an address of the memory of the storage device, wherein the address is predicted based on analysis of the received stream of instructions. In some embodiments, the control circuitry determines a predicted stream of instructions based on the outstanding hardware instruction in the hardware buffer, as well as by analyzing a particular number of the received stream of instructions. In such embodiments, the control circuitry may determine a buffer of the plurality of buffers, wherein the corresponding stream of instructions associated with the data stored in the buffer matches the predicted stream of instructions. Once the control circuitry determines a buffer, the control circuitry, while executing the storage device driver, stores the data to in the buffer at 610.

At step 610, the control circuitry, while executing storage device driver, causes to store the data into a buffer. In some embodiments, the buffer is a buffer of a plurality of buffers available. In some embodiments, the determined buffer may contain data associated with an incomplete stream of instructions such that any data associated with newly detected instructions of the sequential stream of instructions may be stored in the determined buffer. In such an embodiment, the determined buffer is capable to store further data associated with instructions until the stream of instructions has terminated or the buffer reaches full memory capacity. In some embodiments, the control circuitry, while executing the storage device driver, may maintain the data associated with the corresponding streams of instructions associated with each buffer of the plurality of buffers until every buffer has data associated with at least a partial stream of instructions stored for software-based prefetching. In some embodiments of the present disclosure, the control circuitry, while executing the storage device driver, is able to mark buffers as stale or reusable for storing data associated with a newly identified stream of instructions. According to the present disclosure, data associated with at least one instruction of the predicted stream of instructions stored within the determined buffer is executed by the control circuitry, while executing the storage device driver, at 612.

At step 612, the control circuitry, while executing the storage device driver, executes an instruction of the stream of instructions using at least the data stored in the determined buffer. In some embodiments, the control circuitry, while executing the storage device driver, will be able to execute the stream of instructions more efficiently with prefetched the data rather than wait for longer access times for the data associated with each sequential instruction stored in memory. In some embodiments, the streams of instructions are streams of sequential read instructions.

Figure 7:
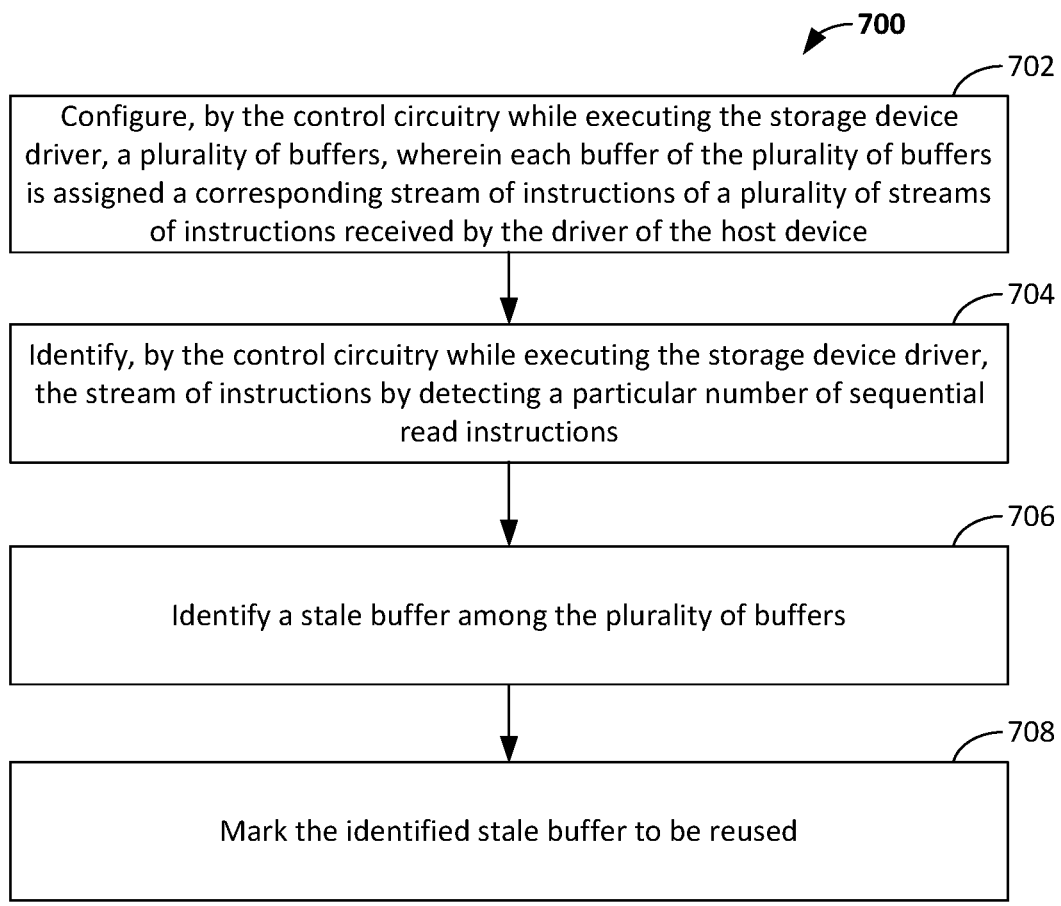
FIG. 7 shows a flowchart illustrating a process for marking an identified stale buffer to be reused, in accordance with some embodiments of the present disclosure.

FIG. 7 shows a flowchart illustrating a process 700 for marking an identified stale buffer to be reused, in accordance with some embodiments of the present disclosure. In some embodiments, the referenced control circuitry, storage device driver, instruction of a stream of instructions, storage device, and a buffer of a plurality of buffers may be implemented as control circuitry 106, storage device driver 118, instruction 108 of a stream of instructions 110, storage device 102, and buffer 114 of plurality of buffers 116, respectively. In some embodiments, the process 700 can be modified by, for example, having steps rearranged, changed, added, and/or removed.

At step 702, the control circuitry, while executing the storage device driver, configures a plurality of buffers, wherein each buffer of the plurality of buffers may be assigned data associated with instructions of a corresponding stream of instruction of a plurality of streams of instructions received by the driver of the storage device. In some embodiments, the plurality of buffers is configured to be wrapped in the storage device driver. Each buffer is to be configured such that if the control circuitry, while executing the storage device driver detects an additional instruction within a received instruction that matches a stream of instruction of a buffer, data associated with the additional instruction may be appended to the end of the buffer. In addition, in some embodiments, each buffer of the plurality of buffers may store data associated with an or an address pointing to data associated with an instruction. In some embodiments, each buffer of the plurality of buffers may correspond to a bit map wherein there the bit map contains a flag bit for each buffer of the plurality of buffers. In some embodiments, the corresponding bitmap is used to keep track of whether a buffer that is storing data associated with a partial stream of instructions or data associated with a complete stream of instructions is still valid. The valid bit may be useful for when determining which buffer memory to clear or overwrite when each buffer of the plurality of buffers is storing data associated with a partial or data associated with a complete stream of instructions. In some embodiments, a valid bitmap uses a single bit for each corresponding data structure (e.g., each buffer) wherein, in some implementations a valid bit value of 1 means that they buffer should not be cleared, and that a valid bit value of 0 indicates that the stream of instructions of that buffer may no longer be needed to be detected.

At step 704, the control circuitry, while executing the storage device driver, identifies the stream of instructions by detecting a particular number of sequential read instructions. In some embodiments, the control circuitry, while executing the storage device driver, determines a predicted stream of instructions by analyzing a particular number of the received stream of instructions. In such embodiments, the control circuitry, while executing the storage device driver, may determine a buffer of the plurality of buffers, wherein the corresponding stream of instructions associated with the stored data of the buffer matches predicted stream of instructions based on the particular number of analyzed instructions of the received stream of instructions. The control circuitry, while executing the storage device driver, may then determine the buffer to be stale among the plurality of buffers, as seen in step 706.

At step 706, the control circuitry, while executing the storage device driver, identifies a stale buffer among the plurality of buffers. After identifying the buffer and completing software-based prefetching for the given predicted stream of instructions, the control circuitry may, while executing the storage device driver, determine that a source of streams of instructions, such as an application that is no longer running and therefore at least one buffer of the plurality of buffers stored data associated with a stream of instructions for the source. Once the control circuitry identifies a stale buffer, the control circuitry, while executing the storage device driver, then marks the identified stale buffer, at step 708.

At step 708, the control circuitry, while executing the storage device driver, marks the identified buffer to be reused. In some embodiments of the present disclosure, the control circuitry, while executing the storage device driver, marks the identified buffer as stale, for example, by toggling the corresponding valid bit of the valid bitmap to indicate that the data within the identified buffer is no longer valid for use. According to the present disclosure, the marked buffer may be reused by data associated with a newly identified stream of instructions by the control circuitry.

Figure 8:
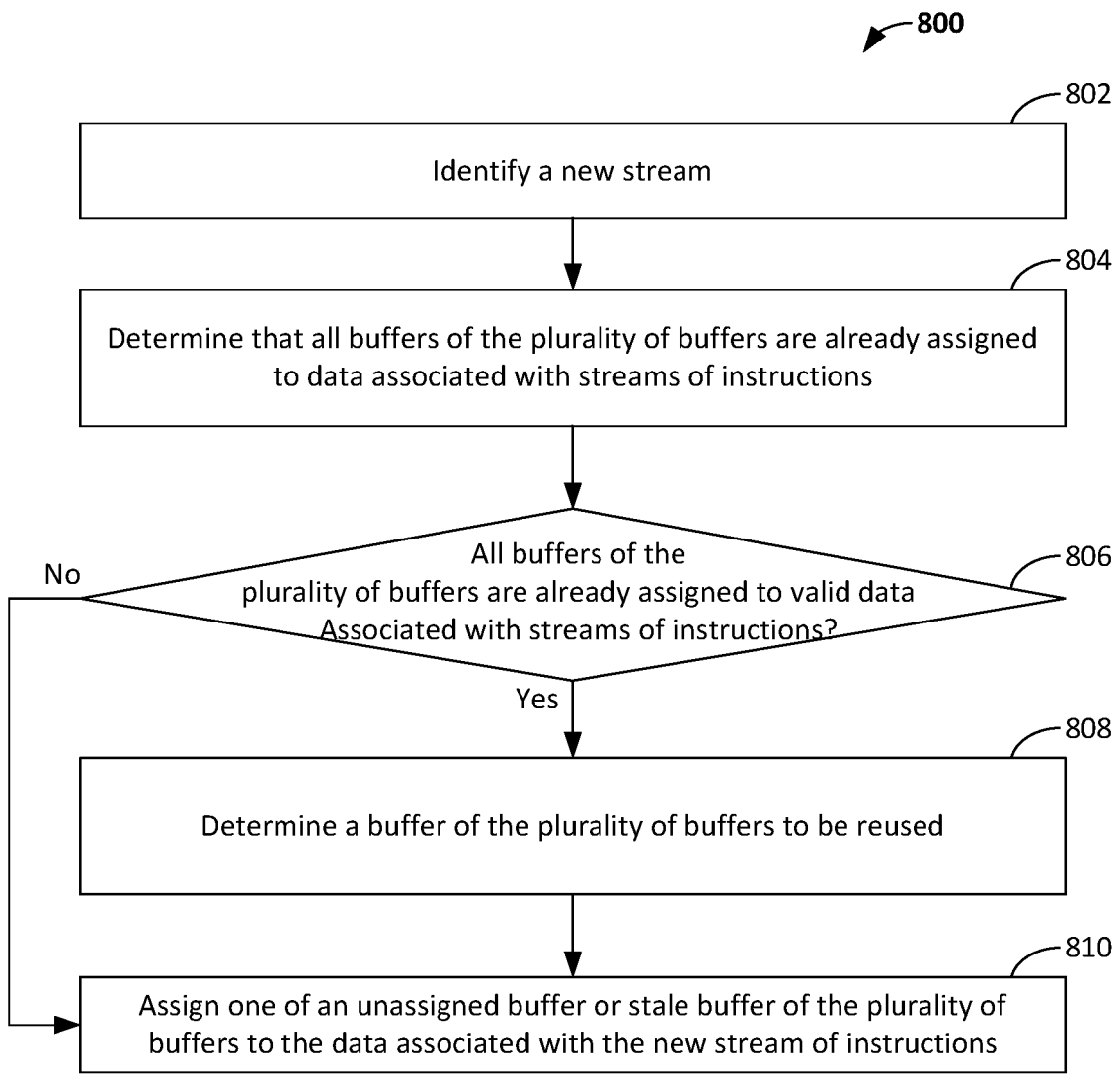
FIG. 8 shows a flowchart illustrating a process for determining a buffer of the plurality of buffers to be reused when each buffer of the plurality of buffers already assigned to data associated with a determined stream of instructions, in accordance with some embodiments of the present disclosure.

FIG. 8 shows a flowchart illustrating a process 800 for determining a buffer of the plurality of buffers to be reused when each buffer of the plurality of buffers already assigned to data associated with a determined stream of instructions, in accordance with some embodiments of the present disclosure. In some embodiments, the referenced control circuitry, storage device driver, instruction of a stream of instructions, storage device, and a buffer of a plurality of buffers may be implemented as control circuitry 106, storage device driver 118, instruction 108 of a stream of instructions 110, storage device 102, and buffer 114 of plurality of buffers 116, respectively. In some embodiments, the process 800 can be modified by, for example, having steps rearranged, changed, added, and/or removed.

At step 802, the control circuitry, while executing the storage device driver, identifies a new stream. In some embodiments, a new stream of instructions may be detected by the control circuitry, while executing the storage device driver, that does not match any of the streams of instructions associated with the stored data of the plurality of buffers. Therefore, data associated with the newly identified stream of instructions is to be stored in a buffer in order to aid in latency reduction for subsequent streams of instructions. In some embodiments, the control circuitry, while executing the storage device driver, is then to determine if all buffers are already assigned to valid data associated with streams of instructions, at 804.

At step 804, the control circuitry, while executing the storage device driver, determines whether all buffers of the plurality of buffers are already assigned to data associated with corresponding streams of instructions. In some embodiments, the control circuitry can, while executing the storage device driver, determine whether each valid bit of the valid bitmap associated with the plurality of buffers is set to valid. The control circuitry, while executing the storage device driver, is then to determine the next step of process 800 based on whether all buffers of the plurality of buffers are already assigned to valid data associated with streams of instructions, at 806.

At step 806, the control circuitry, while executing the storage device driver, determines a next step for the process 800 based on whether all buffers of the plurality of buffers are already assigned to data associated with a corresponding stream of instructions. In some embodiments, if the control circuitry determines that all buffers of the plurality of buffers are already assigned to valid data associated with streams of instructions, the control circuitry, while executing the storage device driver, is to determine a buffer of the plurality of buffers to be reused, at 808. However, if the control circuitry, while executing the storage device driver, determines that there is either an available, unassigned buffer or a stale buffer, the control circuitry is to assign one of the unassigned buffer or stale buffer to the data associated with the new stream of instructions, at 810.

At step 808, the control circuitry, while executing the storage device driver, determines a buffer of the plurality of buffers to be reused. In some embodiments, when each buffer of the plurality of buffers is determined to store valid data associated with a stream of instructions, the control circuitry may have to determine which was the least recently used buffer, the least frequently used buffer for the accessing data associated with a predicted stream of instructions by the control circuitry, or a buffer that is storing data of addresses close to the predicted addresses of the new stream of instructions. The least recently used buffer is the buffer with the longest time to the last access by the control circuitry, which in some examples may indicate that the control circuitry, while executing the storage device driver, is unlikely to receive a stream of instructions that will match the corresponding stream of instructions associated with the stored data of the least recently used buffer. Additionally, other implementations of the present disclosure may have the control circuitry, while executing the storage device driver, determine a buffer to be reused based on which is least frequently used. In such an implementation, the control circuitry may, while executing the storage device driver, maintain a counter for each buffer, wherein the counter increments every time the control circuitry, while executing the storage device driver, accesses the data associated with the corresponding buffer. Therefore, the control circuitry is able to determine a least frequently used buffer as indicated by the buffer with the smallest corresponding counter value. In some embodiments, the control circuitry, while executing the storage device driver, may use a combination of least frequently used and least recently used in order to determine a buffer to reuse. In some embodiments, the buffer that is storing data of addresses close to the predicted addresses of the new stream of instructions may be a buffer that prefetched a first portion of predicted addresses of a stream of instructions, however, the data of a second portion of predicted addresses are also to be prefetched. In some embodiments, if there are no other available buffers, the control circuitry is to reuse the buffer that stored the prefetched data of the first portion of predicted addresses in order to store the prefetched data of the second portion of predicted addresses. Once a buffer is determined, the determined data stored on the buffer is to be cleared in order for data associated with the newly identified stream of instructions to be stored.

At step 810, the control circuitry, while executing the storage device driver, assigns one of an unassigned buffer or stale buffer of the plurality of buffers to data associated with the new stream of instructions. When the control circuitry, while executing the storage device driver, determines that there is at least one of an unassigned buffer or a stale buffer, the control circuitry may, while executing the storage device driver, store data associated with the newly identified onto the unassigned buffer or clear the stale buffer to allow for data associated with the newly identified buffer to be stored. However, for example, if there is one unassigned buffer and one stale buffer available, the control circuitry may, while executing the storage device driver, determine to store the data associated with the newly identified stream of instructions onto an unassigned buffer as it requires less steps to store data associated with the new stream of instructions.

Figure 9:
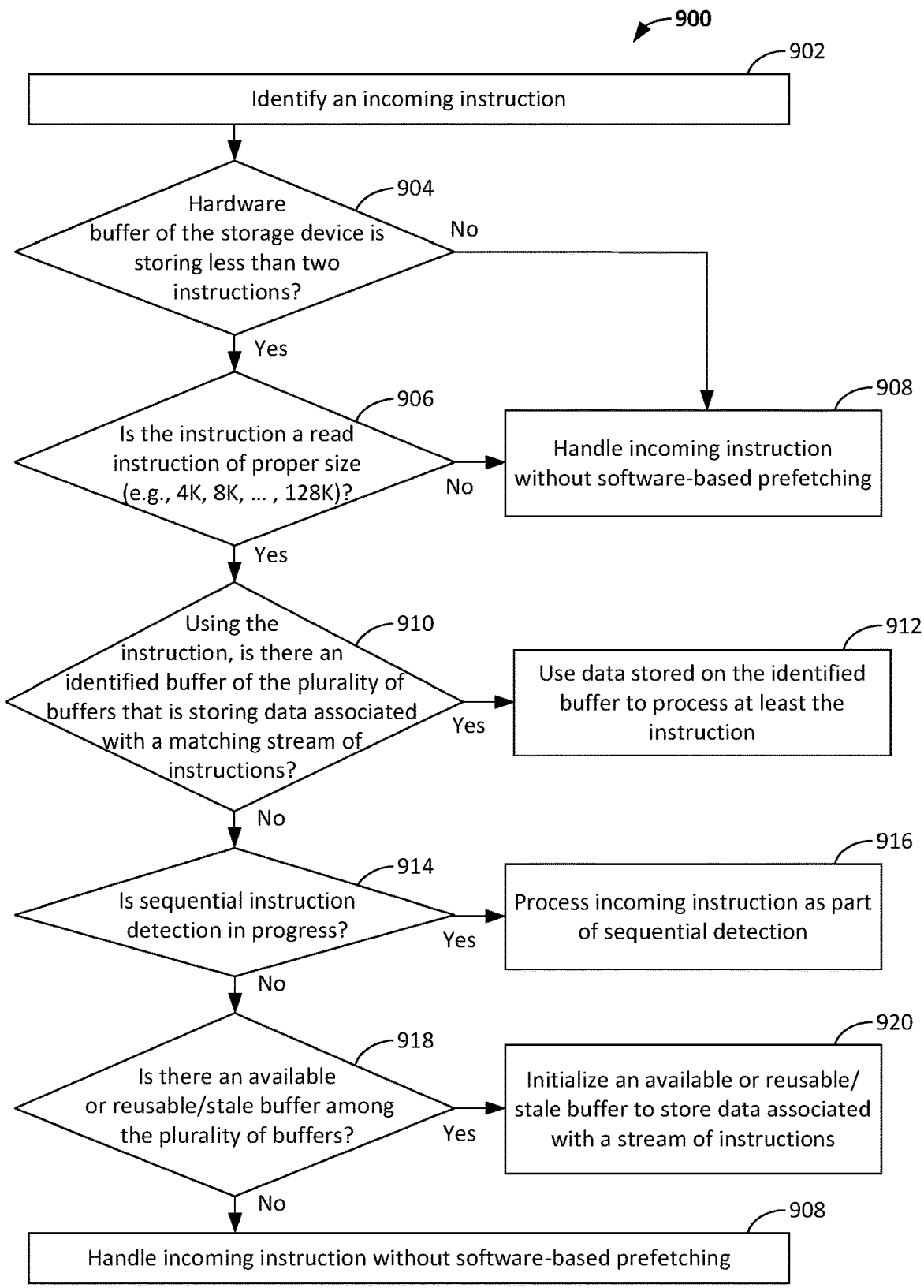
FIG. 9 shows a flowchart illustrating a process for handling an incoming instruction with software-based prefetching, in accordance with some embodiments of the present disclosure.

FIG. 9 shows a flowchart illustrating a process 900 for handling an incoming instruction with software-based prefetching, in accordance with some embodiments of the present disclosure. In some embodiments, the referenced control circuitry, storage device driver, instruction of a stream of instructions, hardware buffer, and a buffer of a plurality of buffers may be implemented as control circuitry 106, storage device driver 118, instruction 108 of a stream of instructions 110, hardware buffer 112, and buffer 114 of plurality of buffers 116, respectively. In some embodiments, the process 900 can be modified by, for example, having steps rearranged, changed, added, and/or removed.

At step 902, the control circuitry, while executing the storage device driver, identifies an incoming instruction. In some embodiments, an incoming instruction may be one instruction of a stream of instructions detected by the control circuitry, while executing the storage device driver. In some embodiments, the control circuitry, while executing the storage device driver, is then to determine the next step of process 900 based on whether the hardware buffer is storing less than two hardware instructions (i.e., or exactly one instructions), at 904.

At step 904, the control circuitry, while executing the storage device driver, determines whether the hardware buffer is storing less than two hardware instructions. In some embodiments, if the control circuitry, while executing the storage device driver, determines that the hardware buffer is storing at least two hardware instructions, the control circuitry is then to handle the incoming instruction without software-based prefetching, at 908. In other embodiments, when the control circuitry, while executing the storage device driver, determines that the hardware buffer is storing less than two hardware instructions, the control circuitry is then to determine the next step of process 900 based on whether the instruction is a read instruction of proper size, at 906.

At step 906, the control circuitry, while executing the storage device driver, determines a next step for the process 900 based on whether the instruction is a read instruction of proper size (e.g., 4 KB, 8 KB, . . . , 128 KB). In some embodiments, if the control circuitry, while executing the storage device driver, determines that the instruction is not a read instruction or not of a proper size, the control circuitry is then to handle the incoming instruction without software-based prefetching, at 908. In other embodiments, when the control circuitry, while executing the storage device driver, determines that the instruction is a read instruction of proper size, the control circuitry is then to determine the next step of process 900 by determining if there is an identified buffer of the plurality of buffers that is storing data associated with a matching stream of instructions, at 910.

At step 908, the control circuitry, while executing the storage device driver, handles the incoming instruction without software-based prefetching. In some embodiments, a hardware buffer with a depth greater than two hardware instructions may not leverage the advantages of software-based-prefetching. Additionally, prefetching data associated to a stream of instructions that includes write instructions does not guarantee accurate prefetched data, because the write instructions may alter the data that has already been prefetched.

At step 910, the control circuitry, while executing the storage device driver, determines a next step for the process 900 by determining if there is an identified buffer of the plurality of buffers that is storing data associated with a matching stream of instructions. In some embodiments, if the control circuitry, while executing the storage device driver, determines that there is an identified buffer that stores data associated with a matching stream of instructions, the control circuitry is then to use the data stored on the identified buffer to process at least the instruction, at 912. In other embodiments, when the control circuitry, while executing the storage device driver, determines that there is not an identified that stores data associated with a matching stream of instructions, the control circuitry is then to determine the next step of process 900 by determining if sequential instruction detection is in progress, at 914.

At step 912, the control circuitry, while executing the storage device driver, uses data stored on the identified buffer to process at least the incoming instruction. In some embodiments, the data associated on the identified buffer is of an instruction stream that matches the incoming stream of instructions.

At step 914, the control circuitry, while executing the storage device driver, determines a next step for the process 900 by determining if sequential instruction detection is in progress. In some embodiments, the control circuitry, while executing the storage device driver, is configured to monitor a particular number of sequential instructions of a stream of instructions before determining a buffer from which to prefetch data. If the control circuitry, while executing the storage device driver, determines that sequential detection is in progress, the control circuitry is to process incoming instruction as part of sequential detection, at 916. In some embodiments, when control circuitry, while executing the storage device driver, determines that sequential detection is not in progress, the control circuitry is to then determine the next step of process 900 by determining if there is an available or reusable/stale buffer among the plurality of buffers, at 918.

At step 916, the control circuitry, while executing the storage device driver, processes the incoming instruction as part of sequential detection. In some embodiments, the instruction is processed and used by the control circuitry, while executing the storage device driver, in order to determine a predicted stream of instructions for software-based prefetching.

At step 918, the control circuitry, while executing the storage device driver, determines a next step for the process 900 by determining if there is an available or reusable/stale buffer among the plurality of buffers. In some embodiments, a buffer of the plurality of buffers may be empty, or not currently storing any data associated with a stream of instructions. In some embodiments, a corresponding valid bit in a valid bit map may denote that a buffer of the plurality of buffers is stale. The data stored on a stale buffer may be cleared or deleted and used for other data associated with a new stream of instructions. In some embodiments, the control circuitry, while executing the storage device driver, determines that there is an available buffer or reusable/stale buffer among the plurality of buffers, the control circuitry is to initialize an available or reusable/stale buffer to store data associated with a stream of instructions, at 920. In some embodiments, when control circuitry, while executing the storage device driver, determines that there is no available or reusable/stale buffer among the plurality of buffers, the control circuitry is to then handle the incoming instruction without software-based prefetching, at 908.

At step 920, the control circuitry, while executing the storage device driver, is to initialize an available or reusable/stale buffer to store data associated with a stream of instructions. In some embodiments, to initialize a stale buffer, the control circuitry is to delete or clear the stale data stored or overwrite the stale data with new data associated with the stream of instructions.

Figure 10:
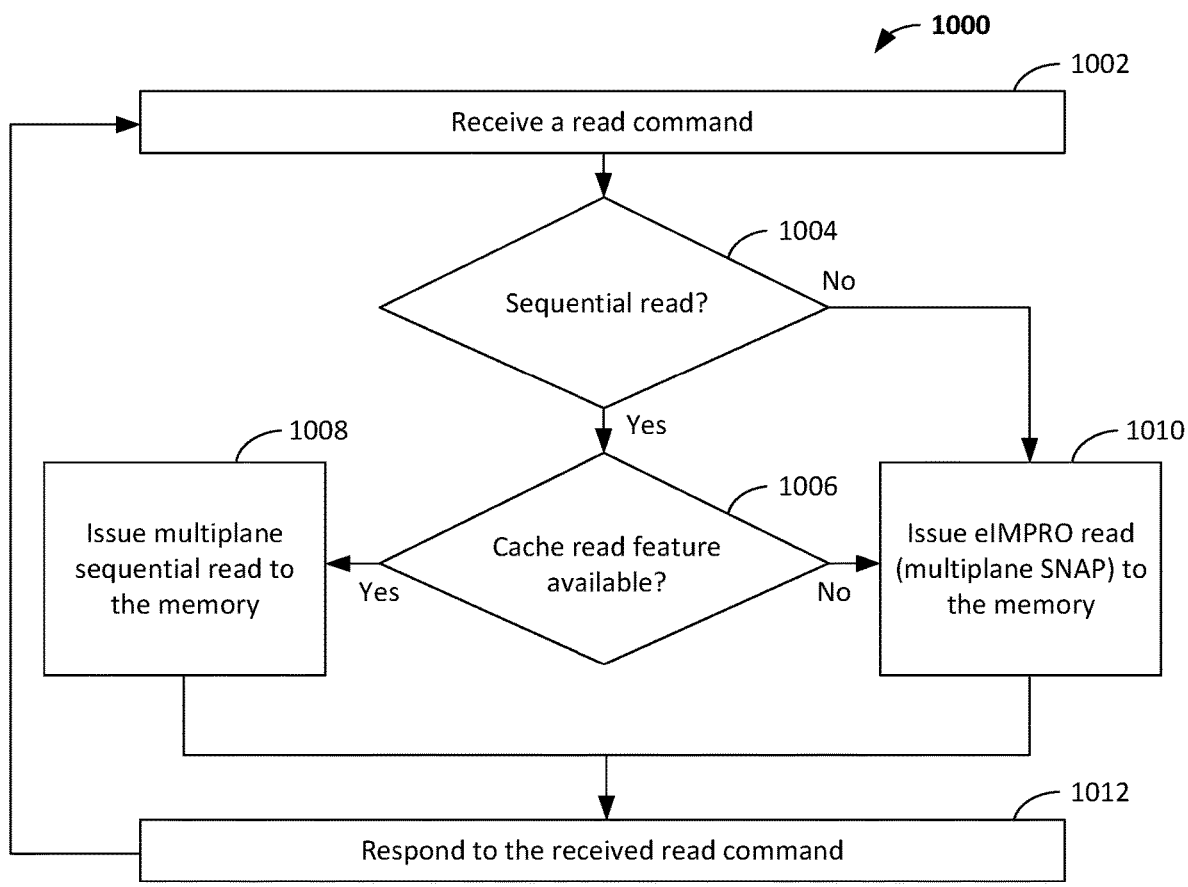
FIG. 10 shows a flowchart illustrating a process for performing independent multi-plane read operation using snap reads caused by a sequential read command, in accordance with some embodiments of the present disclosure.

FIG. 10 shows a flowchart illustrating a process 1000 for performing independent multi-plane read operation using snap reads caused by a sequential read command, in accordance with some embodiments of the present disclosure. In some embodiments, the referenced control circuitry and memory may be implemented as control circuitry 106 and memory 124. Performing process 1000 may improve the efficiency of accessing memory 124. In some embodiments, the process 1000 can be modified by, for example, having steps rearranged, changed, added, and/or removed.

At step 1002, the control circuitry 106 receives a read command. In some embodiments, the read command may be of an external source, outside of the device.

At step 1004, the control circuitry 106 determines whether the read command is a sequential read command. If the read command is a sequential read command, the control circuitry 106 is then to determine if the control circuitry 106 can request a cache read, at step 1006. If the read command is not a sequential read command, the control circuitry 106 is to issue an independent multi-plane read operation (IMPRO) using snap reads to memory 124.

At step 1006, the control circuitry 106 determines whether the control circuitry 106 can request a cache read. In some embodiments, there may not be a cache available to the control circuitry 106. If there is no readable cache available to the control circuitry 106, the control circuitry 106 issues IMPRO using snap reads to the memory 124, at step 1010. If the control circuitry 106 is able to access a cache, the control circuitry 106 issues a multi-plane sequential read to the memory, at step 1008.

At step 1008, the control circuitry 106 issues a multi-plane sequential read to memory 124. In some embodiments, the multi-plane sequential read is an independent multi-plane read operation (IMPRO), which accesses portions of at least two different planes of the memory 124. Once the IMPRO is complete and the control circuitry 106 accesses the requested data, the control circuitry 106 responds to the received read command, at 1012

At step 1010, the control circuitry 106 issues an IMPRO using snap reads to memory 124. The control circuitry 106 is configured to perform IMPRO using snap reads. This allows the control circuitry 106 to perform multi-plane snap reads to access at least two planes of the memory 124. A snap read is used to access a 4K, 8K, or 16K of data from memory 124. In some embodiments, a snap read can be used to access any other suitable size of data from memory 124. Once the IMPRO using snap reads is complete and the control circuitry 106 accesses the requested data, the control circuitry 106 responds to the received read command, at 1012.

At step 1012, the control circuitry 106 generates a response for the received read command, with the accessed data from step 1008 or step 1010. The destination of the response is the same as the source of the received read command.

The terms "an embodiment", "embodiment", "embodiments", "the embodiment", "the embodiments", "one or more embodiments", "some embodiments", and "one embodiment" mean "one or more (but not all) embodiments" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments. Further, although process steps, method steps, algorithms or the like may be described in a sequential order, such processes, methods, and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments need not include the device itself.

At least certain operations that may have been illustrated in the figures show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to be limited to the precise forms disclosed. Many modifications and variations are possible in light of the above teaching.

What is claimed is:

1. A method, comprising:
receiving, by control circuitry while the control circuitry executes a storage device driver of a storage device, at least one read instruction of a stream of read instructions;
determining, by control circuitry, whether the at least one read instruction is part of a sequential stream of read instructions;
in response to the determination that the at least one read instruction is not part of a sequential stream of read instructions:
issuing, by control circuitry, an independent plane read operation to access memory of the storage device across at least two planes of the memory;
in response to the determination that the at least one read instruction is part of a sequential stream of read instructions:
determining, by control circuitry, whether the storage device has a cache read feature available;
in response to the determination that the storage device has a cache read feature available:
issuing, by control circuitry, a multi-plane sequential read command to access the memory across the at least two planes; and
in response to the determination that the storage device does not have a cache read feature available:

issuing, by control circuitry, an independent plane read operation to access memory of the storage device across the at least two planes;

predicting addresses across the at least two planes of the memory that are to be accessed based on an analysis of the stream of read instructions;

accessing data located at the predicted addresses; and executing the at least one read instruction of the stream of read instructions using at least the accessed data.

2. The method according to claim 1, wherein the issuing the independent plane read operation to access memory of the storage device across at least two planes of the memory comprises issuing a snap read operation to access memory of the storage device across at least two planes of the memory.

3. The method according to claim 1, wherein the memory comprises NAND memory.

4. The method according to claim 3, wherein the issuing the independent plane read operation to access memory of the storage device across at least two planes of the memory comprises issuing an independent plane read operation to access NAND memory of the storage device across at most a maximum number of planes which support independent reads.

5. The method according to claim 1, further comprising storing the at least one read instruction of the stream of read instructions into a hardware buffer of the storage device.

6. The method according to claim 5, wherein executing the at least one read instruction of the stream of read instructions comprises scheduling a prefetch command into the hardware buffer of the storage device.

7. The method according to claim 1, further comprising:
identifying the stream of read instructions by detecting a particular number of sequential read instructions.

8. The method according to claim 7, further comprising:
configuring a plurality of buffers, wherein each buffer of the plurality of buffers is assigned a corresponding stream of read instructions of a plurality of streams of read instructions received by the driver of the storage device;
identifying a stale buffer among the plurality of buffers; and
marking the identified stale buffer to be reused.

9. The method according to claim 8, further comprising:
identifying a new stream;
determining that all buffers of the plurality of buffers are already assigned to streams of read instructions; and
in response to identifying a new stream and determining that all buffers of the plurality of buffers are already assigned to streams of read instructions:
determining a buffer of the plurality of buffers to be reused.

10. The method according to claim 9, wherein the determining a buffer of the plurality of buffers to be reused comprises:
determining a least recently used buffer of the plurality of buffers to be reused.

11. The method according to claim 9, wherein the determining a buffer of the plurality of buffers to be reused comprises:
determining a buffer of the plurality of buffers that is associated with a data address that is closest to a current data address of the at least one read instruction of the stream of read instructions.

12. The method according to claim 1, further comprising:
configuring, by the control circuitry while executing the storage device driver, a plurality of buffers;
identifying a new stream; and
assigning one of an unassigned buffer of the plurality of buffers to the new stream.

13. The method according to claim 1, further comprising:
configuring, by the control circuitry while executing the storage device driver, a plurality of buffers, wherein each buffer of the plurality of buffers is assigned a corresponding stream of read instructions of a plurality of streams of read instructions received by the storage device driver;
receiving a first read instruction as part of the stream of read instructions for the storage device;
identifying a buffer of the plurality of buffers associated with the stream of read instructions;
accessing data associated with the predicted addresses of the memory of the storage device; and
causing to be stored the data in the identified buffer of a plurality of buffers.

14. The method according to claim 13, further comprising:
determining that the identified buffer is full;
in response to determining that the identified buffer is full:
ceasing pre-fetching for the stream of read instructions;
receiving a read instruction as part of the stream of read instructions for the storage device that hits a last storage location of the identified buffer; and
in response to receiving a read instruction as part of the stream of read instructions for the storage device that hits the last storage location of the identified buffer:
resuming prefetching further data into the identified buffer.

15. The method according to claim 13, further comprising:
scheduling, by the control circuitry while executing the storage device driver, an additional access of second data from a second address of the storage device that is predicted by analyzing the at least one read instruction of the stream of read instructions.

16. The method according to claim 15, further comprising:
receiving, by the storage device driver, a second read instruction as part of the stream of read instructions for the storage device; and
fulfilling the second read instruction by returning an accessed value stored in the identified buffer of the plurality of buffers.

17. A system, comprising:
storage circuitry; and
control circuitry, while executing a storage device driver of the storage circuitry, to:
receive at least one read instruction of a stream of read instructions;
determine whether the at least one read instruction is part of a sequential stream of read instructions;
in response to the determination that the at least one read instruction is not part of a sequential stream of read instructions:
issue an independent plane read operation to access memory of the storage circuitry across at least two planes of the memory;
in response to the determination that the at least one read instruction is part of a sequential stream of read instructions:
determine whether the storage circuitry has a cache read feature available;
in response to the determination that the storage circuitry has a cache read feature available:

issue a multi-plane sequential read command to access the memory across the at least two planes; and in response to the determination that the storage circuitry does not have a cache read feature available:

issue an independent plane read operation to access memory of the storage circuitry across the at least two planes;

predict addresses across the at least two planes of the memory that are to be accessed based on an analysis of the stream of read instructions;

access data located at the predicted addresses; and execute the at least one read instruction of the stream of read instructions using at least the accessed data.

18. The system of claim 17, wherein to issue the independent plane read operation to access memory of the storage circuitry across at least two planes of the memory the control circuitry is to issue a snap read operation to access memory of the storage circuitry across at least two planes of the memory.

19. The system of claim 17, wherein the memory comprises NAND memory.

20. The system of claim 19, wherein to issue the independent plane read operation to access memory of the storage circuitry across at least two planes of the memory the control circuitry is to issue an independent plane read operation to access NAND memory of the storage circuitry across at most a maximum number of planes which support independent reads.

21. The system of claim 17, wherein the control circuitry is further to store the at least one read instruction of the stream of read instructions into a hardware buffer of the storage circuitry.

22. The system of claim 21, wherein to execute the at least one read instruction of the stream of read instructions, the control circuitry is to schedule a prefetch command into the hardware buffer of the storage circuitry.

23. The system of claim 17, wherein the control circuitry is further to:

identify the stream of read instructions by detecting a particular number of sequential read instructions.

24. The system of claim 23, wherein the control circuitry is further to:

configure a plurality of buffers, wherein each buffer of the plurality of buffers is assigned a corresponding stream of read instructions of a plurality of streams of read instructions received by the driver of the storage circuitry;

identify a stale buffer among the plurality of buffers; and mark the identified stale buffer to be reused.

25. The system of claim 24, wherein the control circuitry is further to:

identify a new stream;

determine that all buffers of the plurality of buffers are already assigned to streams of read instructions; and in response to the identified new stream and the determination that all buffers of the plurality of buffers are already assigned to streams of read instructions:

determine a buffer of the plurality of buffers to be reused.

26. The system of claim 25, wherein to determine the buffer of the plurality of buffers to be reused, the control circuitry is to:

determine a least recently used buffer of the plurality of buffers to be reused.

27. The system of claim 26, wherein the least recently used buffer of the plurality of buffers is a buffer that stores an oldest data to be accessed by the storage device driver.

28. A non-transitory computer-readable medium having non-transitory computer-readable instructions of a storage device driver encoded thereon that, when executed by a control circuitry, cause the control circuitry, while executing instructions of the storage device driver of a storage device, to:

receive at least one read instruction of a stream of read instructions;

determine whether the at least one read instruction is part of a sequential stream of read instructions;

in response to the determination that the at least one read instruction is not part of a sequential stream of read instructions:

issue an independent plane read operation to access memory of the storage device across at least two planes of the memory;

in response to the determination that the at least one read instruction is part of a sequential stream of read instructions:

determine whether the storage device has a cache read feature available;

in response to the determination that the storage device has a cache read feature available:

issue a multi-plane sequential read command to access the memory across the at least two planes; and in response to the determination that the storage device does not have a cache read feature available:

issue an independent plane read operation to access memory of the storage device across the at least two planes;

predict addresses across the at least two planes of the memory that are to be accessed based on an analysis of the stream of read instructions;

access data located at the predicted addresses; and execute the at least one read instruction of the stream of read instructions using at least the accessed data.

* * * * *